Patented Dec. 18, 1951

2,579,417

UNITED STATES PATENT OFFICE 2,579,417

AMMONOLYSIS OF ORGANOSILICON HALIDES

Nicholas D. Cheronis, Chicago, Ill., assignor of one-third to Edwin L. Gustus, Chicago, Ill.

No Drawing. Application August 7, 1947, Serial No. 767,332

14 Claims. (Cl. 260—2)

This invention relates to silicon polymers, and more particularly to new methods of reacting organic silicon halides with ammonia or substituted amines, and with products thus formed.

An object of my invention is the production of ammonolyzed silicon compounds by reacting an aliphatic silicon halide with gaseous ammonia or a gaseous substituted amine.

Another object of my invention is the production of ammonolyzed silicon compounds by reacting an aromatic silicon halide with gaseous ammonia or a gaseous substituted amine.

A further object of my invention is the production of a polymerized silicon resin containing NH$_2$ and/or NH groups directly linked to the silicon atom, with the silicon atoms interconnected by —N— groups.

Still another object of my invention is an ammonolyzed silicon resin capable of rapid but controllable polymerization.

Other objects and advantages of my invention will become apparent as the following description of my invention proceeds.

U. S. patent application Serial No. 616,475, Nicholas D. Cheronis, "Silicon Polymers," filed September 14, 1945 (now abandoned in favor of continuation-in-part application Serial No. 72,548, Nicholas D. Cheronis, "Polymeric Resinous Products Containing Repeating Units of Silicon Linked to Nitrogen and Process for Making Same," filed January 24, 1949) and application Serial No. 643,494, Nicholas D. Cheronis and Edwin L. Gustus, "Preparation of Polymers," filed January 25, 1946, describe methods of ammonolyzing organic silicon halides; application Serial No. 613,009, Nicholas D. Cheronis, "Water-Resistant Leather," filed August 27, 1945 (now abandoned in favor of continuation-in-part application Serial No. 56,663, Nicholas D. Cheronis, "Resin-Impregnated Water-Resistant Leather," filed October 26, 1949), and application Serial No. 643,493, Nicholas D. Cheronis, "Leather Treatment," describe the application of hydrolyzed and/or ammonolyzed organic silicon halides to leather. The present invention deals with novel methods of making ammonolyzed organic silicon halides of the general structure disclosed in these applications, and with new and useful resins prepared therefrom.

A silicone resin is generally understood to be a polymeric compound corresponding to the type formula

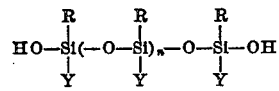

where R stands for an aliphatic or aromatic radical, and where Y stands for an aliphatic or aromatic radical or a hydroxyl group. Such a resin is formed by the condensation of organosilicon hydroxy compounds of the type formula

wherein $n$ does not exceed 2, which in turn are the hydrolysis products of an organic halosilane of the type formula

wherein $n$ also does not exceed 2. Cross linkages within the polymer group may reduce or almost entirely eliminate the hydroxyl groups and replace them by

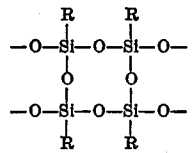

groups.

If organic halosilanes are ammonolyzed in accordance with my invention, and polymerized, organic polymers of the type formula

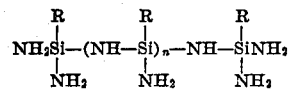

are formed, wherein silicon atoms are interconnected by NH groups and free silicon valences at either end of the polymeric group have NH$_2$ groups attached thereto. The starting material for such compounds are again the organic halosilanes of the type formula

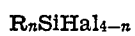

which are treated with ammonia or a substituted amine to substitute the halogens by NH$_2$ groups. Polymerization to the above-described compounds takes place by condensing silicon-attached NH₂ groups to NH groups, with evolution of free ammonia. Cross linkages in the polymeric groups of the polymerized ammonolyzed silanes further reduce or almost entirely eliminate NH₂ groups bonded to silicon with formation of cross linkages

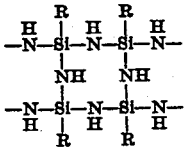

groups.

I have discovered that an organic halosilane may be converted into a corresponding ammonolyzed compound by dissolving it in an organic solvent which is inert towards the organic halosilane (i. e., does not react with it) and reacting it with gaseous ammonia (unsubstituted or substituted) in the absence of water or moisture and under conditions about to be described, and permitting the resulting amino silanes to polymerize to the desired degree. Suitable aliphatic solvents are ethers, such as ethyl ether or propyl ether, while suitable aromatic solvents are toluene or xylene. Organic halosilanes suitable in the reaction are, for instance, mono-, di- or tri-chlorides, bromides, iodides or fluorides of a silane substituted with respectively 3, 2, or 1 alkyl or aryl group. If more than one organic group is attached to the silicon atom, such organic groups need not be identical. Suitable as ammonolyzing agents, in addition to gaseous ammonia, are such compounds gaseous at room temperature as methylamine, ethylamine and other related compounds. In fact, all nitrogen compounds containing at least two replaceable hydrogen atoms directly bonded to a nitrogen atom are suitable for reaction with the silicon compound, so long as care is taken not to introduce any groups into the compound which will prevent polymerization by steric hindrance. To obtain polymerizable compounds, a di- or tri-halogenated organosilane is selected as starting material, inasmuch as hydrolyzed or ammonolyzed monochloro-organosilanes form only dimers:

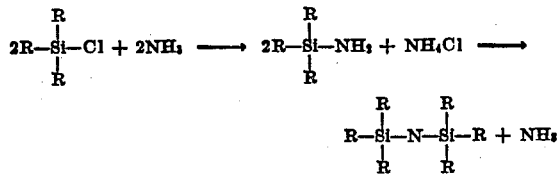

In addition to methyl trichlorosilane, dimethyl dichlorosilane, diethyl dichlorosilane, ethyl trichlorosilane, ethyl tribromosilane, ethyl triiodo silane, ethyl trifluorosilane, ethyl dichloro monofluorosilane, propyl tribromosilane, butyl tri-iodo silane, n-propyl trichlorosilane, dipropyl dichlorosilane, isopropyl trichlorosilane, n-butyl trichlorosilane, isobutyl trichlorosilane, isoamyl trichlorosilane, benzyl trichlorosilane, naphthyl trichlorosilane, amyl ethyl dichlorosilane, propenyl trichlorosilane, phenyl trichlorosilane, diphenyl dichlorosilane, methyl ethyl dichlorosilane, phenyl methyl dichlorosilane, dibenzyl dichlorosilane, p-chlorophenyl silicon trichloride, n-hexyl trichlorosilane, cyclohexyl trichlorosilane, dicyclohexyl dichlorosilane, diisobutyl dichlorosilane, paratolyl trichlorosilane, di-para-tolyl dichlorosilane, parastyryl trichlorosilane, ethynyl trichlorosilane, which are mono-alkyl, di-alkyl, alkyl-aryl and di-aryl halosilanes whose ammonolysis is described in the above-enumerated earlier applications, we find that such organic halosilanes as allyl trichlorosilane, and di-allyl dichlorosilane (halosilanes containing unsaturated alkyl groups), n-dodecyl trichlorosilane (a long-chain alkyl chlorosilane), p-anisyl trichlorosilane, and para-ethoxy phenyl trichlorosilane (chlorosilanes containing aromatic oxy-substituted groups) can be ammonolyzed and polymerized in accordance with the present invention.

Thus, as set for in the copending application Serial No. 72,548, Nicholas D. Cheronis, the repeating units of the polymerized resin consist of silicon to which are attached hydrogen-substituted or hydrocarbon-substituted nitrogen atoms as links to the adjacent repeating units; of the remaining valence or valences of the silicon are taken up by a monovalent hydrocarbon radical. If a tri-functional silane, that is an organosilane having one monovalent hydrocarbon radical and three halogen atoms on the silicon atom, is selected as the starting material, the ammonolysis and subsequent condensation in accordance with the present invention will result in a cross-linked resin, in which each repeating unit consists of a silicon atom to which the monovalent hydrocarbon radical of the starting material remains attached, and which shares with the adjacent repeating units three hydrogen-substituted or hydrocarbon substituted nitrogen atoms.

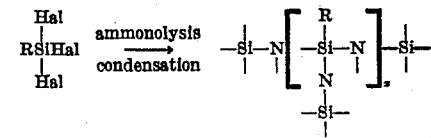

Consequently, the condensation product of an ammonolyzed tri-functional silane is characterized by a silicon to nitrogen average ratio of 1 silicon atom to approximately 1.5 nitrogen atoms in its repeating units; ammonolysis of numerous resins prepared in accordance with my invention has shown the actual existence of this ratio.

If a di-functional organosilane, that is an organosilane with two halogen atoms on the silicon atom, such as diethyldichlorosilane, is ammonolyzed and condensed in accordance with my invention by following the just-described process of reacting the organosilane in the presence of an inert solvent such as ether and in the absence of water, with an excess of liquid ammonia or primary amine wherein the amino group is the sole functional group, followed by partial condensation in solution, the resulting polymeric product is characterized by repeating units wherein two monovalent hydrocarbon radicals are attached to the silicon atom and the remaining two valences of the silicon atom are taken up by hydrogen-substituted or hydrocarbon-substituted nitrogen links to the adjacent repeating unit.

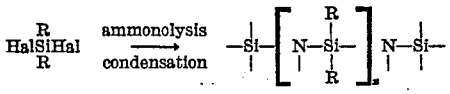

Consequently, the average silicon to nitrogen ratio in the repeating units of such a resin is 1 silicon atom to approximately 1 nitrogen atom, which fact is also proved by analysis of numerous resins prepared by me from di-functional organosilanes.

Three preferred examples of ammonolysis and polymerization in accordance with the present invention will now be given by way of illustration:

Example I

A three neck flask squipped with mechanical stirrer and containing 500 ml. of dry ether is immersed into a cooling bath; the latter can either be an intimate mixture of ice and salt or Dry Ice and methanol. Through one of the necks fits a separatory funnel containing 100 grams of an aliphatic chlorosilane, for example, diethyl dichlorosilane, in 500 ml. of dry ether and through the other the inlet tube for ammonia gas. The stirrer is started until the temperature of the ether within the flask reaches about —10° C. and then gaseous ammonia is introduced while the solution of chlorosilane is admitted dropwise through the ether ammonia mixture. The addition of the reactants is so controlled as to maintain a temperature substantially below 0° C. Ammonolysis takes place with separation of ammonium chloride and formation of the organosilicon amino compound according to the formula:

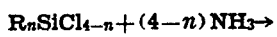
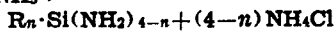

$R_n SiCl_{4-n} + (4-n) NH_3 \rightarrow R_n \cdot Si(NH_2)_{4-n} + (4-n) NH_4Cl$ The addition of the chlorosilane and the action of the stirrer is controlled so as to insure an excess of ammonia within the reaction mixture at all times and also avoid a rise in temperature much above 0° C. Completion of the reaction is indicated by a rapid falling of the temperature of the reaction mixture. The contents of the flask are now filtered to remove the ammonium chloride, and the residue is washed with ether so as to remove the adhering organosilicon amine compound. A stable solution is obtained by removing all or part of the ether and adding an appropriate amount, say 100 grams, of water-free xylene. The removal of ether or concentration is best done under reduced pressure and at a temperature below 50° C. Other hydrocarbon solvents which are inert towards the aminosilicon compounds formed are suitable, as for example, hexane and toluene. To avoid undesired hydrolysis of the aminosilicon compounds, it is necessary that the reaction takes place in the absence of moisture and that anhydrous solvents be used. The product formed is stable in solutions of organic solvents with which the organosilicon amino compound does not react and so long as reasonable care is exercised that moisture is excluded from the solution. The yield is about 90–95% of the theoretic as determined by evaporating in a watch glass a known amount of the solution at about 60 to 100° C. and determining the amount of solid organosilicon compound.

All aliphatic silicon halides enumerated in this specification may be thus ammonolyzed to yield the corresponding aliphatic organosilicon amino compounds ("silamines"), including particularly ethyl triamino silane ammonolyzed from ethyltrichlorosilane, and diethyl diaminosilane ammonolyzed from diethyl aminosilane.

The stable solution is believed to contain not only the monomeric units of the organosilicon amino compounds, but also low-molecular-weight intermediate polymers. When a film of this solution is allowed to evaporate at room temperature, the low-molecular-weight units polymerize (or condense) with evolution of ammonia, giving high-molecular polymers which are insoluble in organic solvents and are very stable. In this respect, this type of compounds varies widely from the hydroxy organosilicon compounds which require heat for polymerization.

Example II

A neck flask surrounded by an ice-salt bath and equipped with a stirrer is charged with 100 grams of an aromatic chlorosilane, for example, p-ethoxy-phenyl trichlorosilane, and a large excess, say one liter, of water-free xylene: the solution is stirred until it reaches a temperature of about +10° C. The reaction with gaseous ammonia is carried out in the manner described in Example I.

After completion of the ammonolysis the aromatic silamine corresponding to the reacted aromatic chlorosilane is obtained. As no ether is introduced into the system, no removal of ether takes place. The formed aromatic silamine-in-xylene solution is stable and represents a yield of approximately 95%. Care must be taken not to introduce water into the system during the reaction in order to avoid undesired hydrolysis. All aromatic silicon halides enumerated in this specification may be thus ammonolyzed to silicon amines ("silamines"), including particularly phenyl triamino silane (ammonolyzed from phenyl trichlorosilane), and diphenyl diamino silane (ammonolyzed from diphenyl dichlorosilane).

Example III

Silamines obtained by ammonolysis according to Example I are polymerized by causing the solvent to evaporate or volatilize, e. g., by application of moderate heat, or exposure to air at room temperature. Resinous films are obtained, possessing the following characteristics:

(a) Polymerized dodecyl silicon triamine obtained by the ammonolysis and polymerization of dodecyl trichlorosilane is a clear, soft, non-tacky, pliable film.

(b) Polymerized allyl silicon triamine obtained by the ammonolysis and polymerization of allyl trichlorosilane is a hard, brittle film.

(c) Polymerized diallyl silicon diamine obtained by the ammonolysis and polymerization of diallyl dichlorosilane is an oily film, presumably due to the absence of cross linkages at room temperature. At temperatures of 100° C. and higher, it turns into a hard and brittle film.

(d) p-Anisyl silicon triamine obtained by the ammonolysis of p-anisyl trichlorosilane polymerizes at room temperature to a brittle and hard film which, if heated to 100° C., turns yellow.

(e) Polymerized p-ethoxy phenyl silicon triamine obtained by the ammonolysis and polymerization of p-ethoxy-phenyl trichlorosilane is a brittle and hard film at room temperature and does not change at 100° C., but cracks and peels if heated to 200° C.

(f) Polymerized cyclohexyl silicon triamine, obtained by the ammonolysis and polymerization of cyclohexyl-trichlorosilane, is a non-tacky, flexible clear film, stable at 60° C. but becoming brittle upon heating to about 200° C.

Other long-chain saturated hydrocarbon substituted silamine resins whose properties are comparable to polymerized dodecyl silicon triamine (Example III (a) above) can be formed in accordance with my invention, e. g., by ammonolyzing and condensing an organosilicon compound of the type

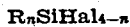

wherein R is a long saturated hydrocarbon chain with at least eight carbon atoms in the chain and $n$ does not exceed 2, in accordance with the methods of Examples I and II.

The same is true of the formation of silamine resins having at least one unsaturated hydrocarbon chain attached to a silicon atom. Polymerized allyl silicon triamine (Example III (b) above) and polymerized diallyl silicon diamine (Example III (c) above) are typical of this type of resin which has the general formula

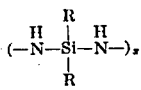

with at least two NH groups attached to the silicon atom, and unsaturated hydrocarbon radicals satisfying the remainder of the valences of the silicon atom.

Polymerized p-anisyl-triamine (Example III (d) above) and polymerized p-ethoxy phenyl silicon triamine (Example III (e) above) are typical of silamine resins in which at least one alkoxy-substituted aromatic radical is attached to the silicon atom.

Polymerized cyclohexyl silicon triamine (Example III (f) above) is a typical silamine resin with one or more valences of the silicon atom satisfied by an alicyclic hydrocarbon radical.

It will be understood that the corresponding fluoro-, bromo- and iodo-silanes may be substituted for the chlorosilanes mentioned in the above examples.

Mixtures of fully substituted organic silicon monoamines, diamines and triamines can be so adjusted that the resin resulting from their polymerization possesses any desired properties with regard to hardness or tackiness. Thus, an organic silicon triamine polymerized by itself will yield a harder and more brittle film than a mixture of a polymerized triamine with a diamine or monoamine. The resins are tough and flexible and thus are eminently adapted for the impregnation of leather, textiles, papers and other flexible materials, and they possess favorable adhesive properties with regard to metal (e. g., steel), glass, etc. They are water repellent, though air permeable.

In order to carry out successfully the ammonolysis of organic halosilanes, it is necessary to maintain at all times during the reaction an excess of the ammonolyzing nitrogen compound, e. g., of ammonia. Likewise, it is necessary to carry out the reaction at temperatures substantially below room temperature; the most favorable temperature differs with each individual ammonolyzing nitrogen compound.

Polymerization of the organic silamines made in accordance with my process takes place at temperatures somewhat above room temperature, in the neighborhood of 60° C. Even at room temperatures spontaneous polymerization takes place upon exposure to the air for one or two days. Polymerization takes place by elimination of ammonia groups which separate out in gaseous form and may be collected by appropriate measures, e. g., in a hood. The polymerization, or rather condensation, of an organic diamino-substituted silicon monomer may be represented by the formula

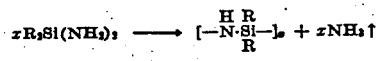

In the condensation of a triamino-substituted organic silicon monomer, cross linkages by NH groups are formed:

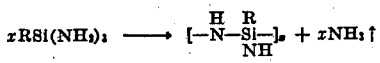

Monoamino-substituted organic silicon monomers form only dimers:

A chief advantage of silamine condensation as compared with the condensation of chlorosilanes is the absence of hydrochloric acid as a byproduct of the condensation; hydrochloric acid is injurious to textiles and other materials which, however, can be safely coated with a silamine polymerized thereon in situ.

The terms "polymerization" and "condensation," as well as "polymerize" and "condense," are used as synonyms throughout the specification and claims.

I do not wish to limit myself to the foregoing specific examples of methods to prepare organic silamines in accordance with my invention, nor to any particular proportions of reactants, speeds of reaction, etc. Modifications of my gaseous ammonia ammonolysis of organosilicon halides in the absence of water or moisture, within the spirit of my invention, will readily occur to an expert skilled in the art of synthesizing organosilicon compounds. Likewise, other silamines than those specifically enumerated in the foregoing specification and examples, e. g., homologues of the named compounds, may be prepared in accordance with my disclosure and thus are within the scope of my invention. I therefore desire to limit my invention only by the appended claims.

I claim:

1. The method of ammonolyzing an organic silicon halide of the formula

wherein R is an organic monovalent radical attached to the silicon by a silicon-to-carbon bond and being a member of the group consisting of unsubstituted and alkoxy-substituted monovalent hydrocarbon radicals, Hal is a halogen atom attached to a silicon atom, and $n$ is an integer from 1 to 2, comprising dissolving said organic silicon halide in an organic solvent inert toward said organic silicon halide, reacting said dissolved organic silicon halide with an ammonolyzing gaseous nitrogen compound selected from the class consisting of gaseous ammonia and gaseous primary amine wherein the amino group is the sole functional group, by simultaneously introducing controlled streams of said dissolved organic silicon halide and of an excess of said gaseous nitrogen compound into a reaction vessel in the absence of water and at a temperature below room temperature, and maintaining the temperature of the reaction by adjusting the reactant supply so as to maintain an excess of said gaseous nitrogen compound until said reaction is substantially complete.

2. The method of ammonolyzing an organic silicon halide of the formula $$R_nSiHal_{4-n}$$

wherein R is an aliphatic monovalent radical attached to the silicon by a silicon-to-carbon bond and being a member of the group consisting of unsubstituted and alkoxy-substituted monovalent hydrocarbon radicals, Hal is a halogen atom, and $n$ is an integer from 1 to 2, comprising dissolving said aliphatic silicon halide in an ether inert toward said organic silicon halide, contacting said dissolved organic silicon halide with an ammonolyzing gaseous nitrogen compound selected from the class consisting of gaseous ammonia and gaseous primary amine wherein the amino group is the sole functional group, by simultaneously introducing controlled streams of said dissolved organic silicon halide and of an excess of said gaseous nitrogen compound into a reaction vessel in the absence of water and at a temperature below room temperature and above the boiling point of said ammonolyzing compound, and maintaining the temperature of the reaction by adjusting the reactant supply so as to maintain an excess of said gaseous nitrogen compound until said reaction is substantially complete.

3. The method of ammonolyzing an organic silicon halide of the formula $$R_nSiHal_{4-n}$$

wherein R is an aromatic radical being a member of the group consisting of unsubstituted and alkoxy-substituted monovalent aromatic hydrocarbon radicals, Hal is a halogen atom, and $n$ is an integer from 1 to 2, comprising dissolving said aromatic silicon halide in a hydrocarbon solvent inert toward said organic silicon halide, reacting said dissolved organic silicon halide with an ammonolyzing gaseous nitrogen compound selected from the class consisting of gaseous ammonia and gaseous primary amine wherein the amino group is the sole functional group, by simultaneously introducing controlled streams of said dissolved organic silicon halide and of an excess of said gaseous nitrogen compound into a reaction vessel in the absence of water and at a temperature below room temperature and above the boiling point of said ammonolyzing compound, and maintaining the temperature of the reaction by adjusting the reactant supply so as to maintain an excess of said gaseous nitrogen compound until said reaction is substantially complete.

4. The method of ammonolyzing an organic silicon halide of the formula $$R_nSiHal_{4-n}$$

wherein R is an aromatic radical being a member of the group consisting of unsubstituted and alkoxy-substituted monovalent aromatic hydrocarbon radicals, Hal is a halogen atom, and $n$ is an integer from 1 to 2, comprising dissolving said aromatic silicon halide in an aromatic solvent inert toward said organic silicon halide, said solvent being selected from the group consisting of xylene and toluene, reacting said dissolved organic silicon halide with an ammonolyzing gaseous nitrogen compound selected from the class consisting of gaseous ammonia and gaseous primary amine wherein the amino group is the sole functional group, by simultaneously introducing controlled streams of said dissolved organic silicon halide and of an excess of said gaseous nitrogen compound into a reaction vessel in the absence of water and at a temperature below room temperature and above the boiling point of said ammonolyzing compound, and maintaining the temperature of the reaction by adjusting the reactant supply so as to maintain an excess of said gaseous nitrogen compound until said reaction is substantially complete.

5. The method of ammonolyzing an organic silicon halide of the formula $$R_nSiHal_{4-n}$$

wherein R is an unsaturated alkyl radical, Hal is a halogen atom attached to a silicon atom, and $n$ is an integer from 1 to 2, comprising dissolving said organic silicon halide in an organic solvent inert towards said organic silicon halide, reacting said dissolved organic silicon halide in the absence of water and at a temperature below room temperature with an ammonolyzing gaseous nitrogen compound selected from the class consisting of gaseous ammonia and gaseous primary amine wherein the amino group is the sole functional group, by simultaneously introducing controlled streams of said dissolved organic silicon halide and of an excess of said gaseous nitrogen compound into a reaction vessel and maintaining the temperature of the reaction by adjusting the reactant supply so as to maintain an excess of said gaseous nitrogen compound until said reaction is substantially complete.

6. The method of ammonolyzing an organic silicon halide of the formula $$R_nSiHal_{4-n}$$

wherein R is an alkoxy-substituted aromatic radical, Hal is a halogen atom attached to a silicon atom, and $n$ is an integer from 1 to 2, comprising dissolving said organic silicon halide in an organic solvent inert towards said organic silicon halide, reacting said dissolved organic silicon halide in the absence of water and at a temperature below room temperature with an ammonolyzing gaseous nitrogen compound selected from the class consisting of gaseous ammonia and gaseous primary amine wherein the amino group is the sole functional group, by simultaneously introducing controlled streams of said dissolved organic silicon halide and of an excess of said gaseous nitrogen compound into a reaction vessel and maintaining the temperature of the reaction by adjusting the reactant supply so as to maintain an excess of said gaseous nitrogen compound until said reaction is substantially complete.

7. The method of ammonolyzing an organic silicon halide of the formula $$R_nSiHal_{4-n}$$

wherein R is a long-chain saturated alkyl radical with at least eight carbon atoms, Hal is a halogen atom attached to a silicon atom, and $n$ is an integer from 1 to 2, comprising dissolving said organic silicon halide in an organic solvent inert toward said organic silicon halide, reacting said dissolved organic silicon halide in the absence of water and at a temperature below room temperature with an ammonolyzing gaseous nitrogen compound selected from the class consisting of gaseous ammonia and gaseous primary amine wherein the amino group is the sole functional group, by simultaneously introducing controlled streams of said dissolved organic silicon halide and of an excess of said gaseous nitrogen compound into a reaction vessel and maintaining the temperature of the reaction below room temperature by adjusting the reactant supply so as to maintain an excess of said gaseous nitrogen compound until said reaction is substantially complete.

8. The method of ammonolyzing an organic silicon halide of the formula

wherein R is a cyclic hydrocarbon radical, Hal is a halogen atom attached to a silicon atom, and $n$ is an integer from 1 to 2, comprising dissolving said organic silicon halide in an organic solvent inert toward said organic silicon halide, reacting said dissolved organic silicon halide in the absence of water and at a temperature below room temperature with an ammonolyzing gaseous nitrogen compound selected from the class consisting of gaseous ammonia and gaseous primary amine wherein the amino group is the sole functional group, by simultaneously introducing controlled streams of said dissolved organic silicon halide and of an excess of said gaseous nitrogen compound into a reaction vessel and maintaining the temperature of the reaction below room temperature by adjusting the reactant supply so as to maintain an excess of said gaseous nitrogen compound until said reaction is substantially complete.

9. The method of ammonolyzing a fully substituted organic silicon halide of the formula

wherein R is a monovalent organic radical attached to the silicon by a silicon-to-carbon bond and being a member of the group consisting of monovalent unsubstituted and alkoxy-substituted hydrocarbon radicals, Hal is a halogen atom and $n$ is an integer from 1 to 2, comprising slowly contacting by simultaneous introduction into a reaction vessel controlled streams of said silicon halide and of an excess of a gaseous ammonolyzing nitrogen compound having at least two replaceable hydrogen atoms at a temperature below 0° C., the silicon compound being dissolved in an inert organic solvent, and separating the ammonolyzed reaction product from the excess reactants and byproducts.

10. The method of ammonolyzing a fully substituted organic silicon halide of the formula $R_nSiHal_{4-n}$, wherein R is a monovalent organic radical attached to the silicon by a silicon-to-carbon bond and being a member of the group consisting of monovalent unsubstituted and alkoxy-substituted hydrocarbon radicals, Hal is a halogen atom and $n$ is an integer from 1 to 2, comprising slowly contacting by simultaneous introduction into a reaction vessel controlled streams of said silicon halide and of an excess of gaseous ammonia at a temperature below 0° C., the silicon compound being dissolved in an inert organic solvent, and separating the ammonolyzed reaction product from the excess reactants and from the ammonium halide also formed.

11. The method according to claim 10, wherein said inert organic solvent is ether.

12. A polymeric resin characterized by repeating units of silicon linked to nitrogen as an integral part of the polymer chain in which the repeating units consist of silicon substituted by at least one monovalent alkoxy-substituted aromatic radical, said silicon being attached to nitrogen substituted by a member of the group consisting of hydrogen and hydrocarbon radicals, said resin having an average ratio of one atom of silicon to approximately 1.5 atoms of nitrogen in its repeating units.

13. A polymeric resin characterized by repeating units of silicon linked to nitrogen as an integral part of the polymer chain in which the repeating units consist of silicon substituted by a p-anisyl radical, said silicon being attached to nitrogen substituted by a member of the group consisting of hydrogen and hydrocarbon radicals, said resin having an average ratio of one atom of silicon to approximately 1.5 atoms of nitrogen in its repeating units.

14. A polymeric resin characterized by repeating units of silicon linked to nitrogen as an integral part of the polymer chain in which the repeating units consist of silicon substituted by a p-ethoxy phenyl radical, said silicon being attached to nitrogen substituted by a member of the group consisting of hydrogen and hydrocarbon radicals, said resin having an average ratio of one atom of silicon to approximately 1.5 atoms of nitrogen in its repeating units.

NICHOLAS D. CHERONIS.

REFERENCES CITED

The following references are of record in the file of this patent:

UNITED STATES PATENTS

| Number | Name | Date |
|---|---|---|
| 2,369,117 | Carter | Feb. 13, 1945 |
| 2,429,883 | Johannson | Oct. 28, 1947 |
| 2,457,539 | Elliot et al. | Dec. 28, 1948 |
| 2,462,635 | Haber | Feb. 22, 1949 |
| 2,553,314 | Haber | May 15, 1951 |

OTHER REFERENCES

Stock et al.: Berichte Deut. Chem. Gesel., vol. 156, 1923, pp. 986 and 992 to 997.

Sauer: Jour. Amer. Chem. Soc., vol. 66, 1944, pp. 1707 to 1710.